US012762924B2

United States Patent

(12) United States Patent
Alvarez et al.

(10) Patent No.: US 12,762,924 B2
(45) Date of Patent: Oct. 13, 2026

(54) DIGITAL ASSETS FOR CONFIGURATION OF AN ELECTRONIC GAMING MACHINE

(71) Applicant: IGT, Las Vegas, NV (US)

(72) Inventors: Ommar Alvarez, Las Vegas, NV (US); Gaurav Jariwala, Halifax (CA); Michael Russ, Graz (AT); Stefan Keilwert, St. Josef (AT); Sven Aurich, Schwanberg (AT)

(73) Assignee: IGT, Las Vegas, NV (US)

(*) Notice: Subject to any disclaimer, the term of this patent is extended or adjusted under 35 U.S.C. 154(b) by 193 days.

(21) Appl. No.: 18/476,159

(22) Filed: Sep. 27, 2023

(65) Prior Publication Data

US 2025/0104511 A1 Mar. 27, 2025

(51) Int. Cl.
*G07F 17/32* (2006.01)
*H04L 9/00* (2022.01)

(52) U.S. Cl.
CPC ...... *G07F 17/3227* (2013.01); *G07F 17/3241* (2013.01); *G07F 17/3267* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | | |
|---|---|---|---|---|
| 9,876,646 | B2 * | 1/2018 | Ebrahimi | H04L 9/3263 |
| 2019/0333316 | A1 * | 10/2019 | Nelson | G07F 17/3211 |
| 2020/0020194 | A1 * | 1/2020 | Higgins | G07F 17/3206 |
| 2020/0045421 | A1 * | 2/2020 | Keilwert | H04R 5/02 |
| 2023/0094247 | A1 * | 3/2023 | Nuhoglu | G06Q 20/02 463/40 |
| 2023/0121779 | A1 | 4/2023 | Quigley et al. | |
| 2023/0298435 | A1 * | 9/2023 | Dalmia | G07F 17/3241 463/42 |

* cited by examiner

*Primary Examiner* — Ronald Laneau
(74) *Attorney, Agent, or Firm* — Sheridan Ross P.C.

(57) ABSTRACT

An electronic gaming machine (EGM) configuration system can be configured to manage digital assets for configuration of an EGM. The EGM configuration system can receive an indication of an identity of a user. The EGM configuration system can further determine an EGM configuration associated with the user based on the identity of the user. The EGM configuration system can further transmit an indication of the EGM configuration to the EGM.

20 Claims, 8 Drawing Sheets

DIGITAL ASSETS FOR CONFIGURATION OF AN ELECTRONIC GAMING MACHINE

BACKGROUND

Embodiments described herein relate to electronic gaming machines (EGMs). EGMs can include one or more games (e.g., wagering games) stored therein that can be played by a player. The EGM can provide a prize to the player based on a wager and an outcome of a wagering game. An example of a wagering game includes a slot game in which, in response to receiving a wager from the player, one or more rows of symbols are revealed. A prize can be provided to the player based on the one or more rows of symbols including one or more winning combinations of symbols.

SUMMARY

According to some embodiments a method of operating an electronic gaming machine (EGM) configuration system is provided. The method includes receiving an indication of an identity of a user. The method further includes determining an EGM configuration associated with the user based on the identity of the user. The method further includes transmitting an indication of the EGM configuration to the EGM.

According to other embodiments, a method of operating an electronic gaming machine (EGM) is provided. The method include determining an indication of an EGM configuration associated with a user of the EGM. The method further includes operating the EGM using the EGM configuration.

According to other embodiments, a method of operating a system configured to provide a marketplace for electronic gaming machine (EGM) configurations is provided. The method includes receiving a request to transfer ownership of an EGM configuration from a first entity to a second entity. The EGM configuration includes a graphics configuration that affects graphics displayed during operation of an EGM; an audio configuration that affects sound output during operation of the EGM; and a gambling configuration that affects default gambling settings during operation of the EGM. The method further includes generating a blockchain token indicating the EGM configuration. The method further includes providing an indication of the blockchain token to the second entity.

According to other embodiments, an EGM, a system, or non-transitory computer-readable medium are provided for performing the above methods.

DETAILED DESCRIPTION

Electronic gaming machines (EGMs) can provide a game based on a set of configurations. In some examples, the configurations are associated with operation of the EGM such as a text size, screen brightness, or default bet size. In additional or alternative examples, the configurations are associated with a theme (e.g., an aesthetic and/or sound) of the game. A theme can be reskinned with altered graphics and subsequently released as a new edition of the game without any alternations to the pay table and game mechanics. That is, only surface-level elements (e.g., aesthetics) are changed, but the foundation of the game itself remains unchanged.

As provided herein, non-fungible tokens (NFTs) are assets that have been tokenized via a block chain. These NFTs may be assigned unique identification codes and/or metadata that distinguishes them from other tokens. Some embodiments rely on an exchange to create a token for a given image. In some cases, such tokens may be deemed highly valuable by some and worth very little to others. Some embodiments provide that some NFT's may appear the same but are not interchangeable based on other data and/or features. NFTs may represent digital and/or real-world items. Some embodiments provide that tokenizing real-world items as tangible assets to improve the efficiency of buying, selling and/or trading and/or may lower a risk of fraud.

Various embodiments herein describe generating a digital asset (e.g., a NFT) indicating a configuration set (e.g., a theme). A player can own the digital assets and subsequently use the NFT to cause an EGM to use the configuration set. Rather than spending operator time on deciding which reskinned themes are placed (and/or additional casino floor space on different EGMs offering different themed games), it can be beneficial to generate a game theme (also referred to herein as a game skin) as a digital asset. By offering/selling skins as digital assets, players can resell valued skins amongst each other in case they lose interest in the game. This simultaneously encourages the player community surrounding a game to be active while assuring players that the purchasing of these skins can be a cost they can recoup.

In some embodiments, these digital asset transactions can be recorded on a corporate blockchain ledger to guarantee fidelity, security of the data, and allow a game theme designer to offer this platform without third party involvement. In some examples, these digital assets may not be able to be duplicated and redistributed within the player community. In additional or alternative examples, during each transaction, the buying/selling of game skins is recorded in a block chain ledger and the purchaser of the digital asset is the sole owner until they decide otherwise. An online webservice can be offered as the marketplace for the buying and selling of these digital assets.

Figure 1:
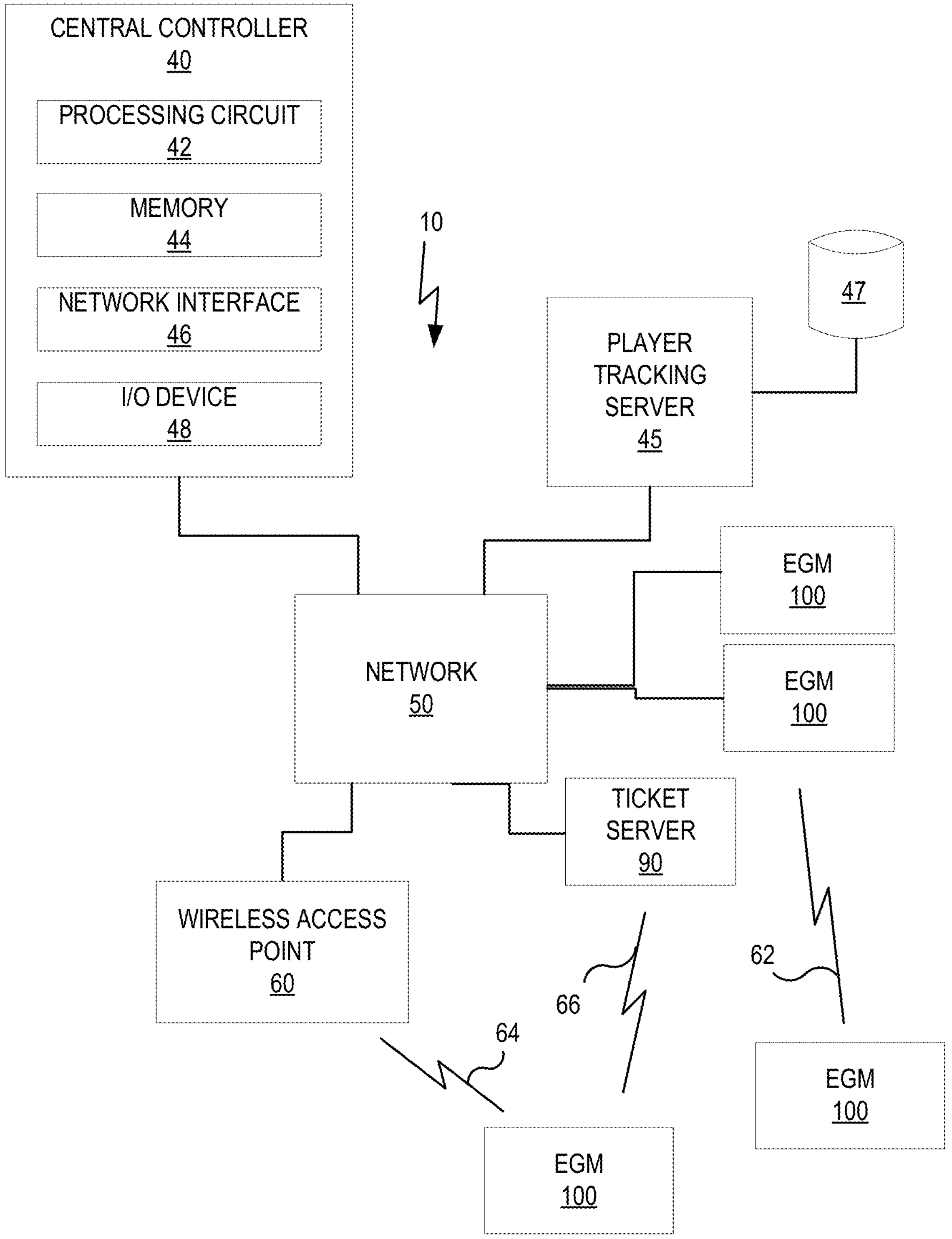
FIG. 1 is a schematic block diagram illustrating an example of a network configuration for a plurality of gaming devices according to some embodiments.

Before describing these and other features in greater detail, reference is now made to FIG. 1, which illustrates a gaming system 10 including a plurality of gaming devices 100. The gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
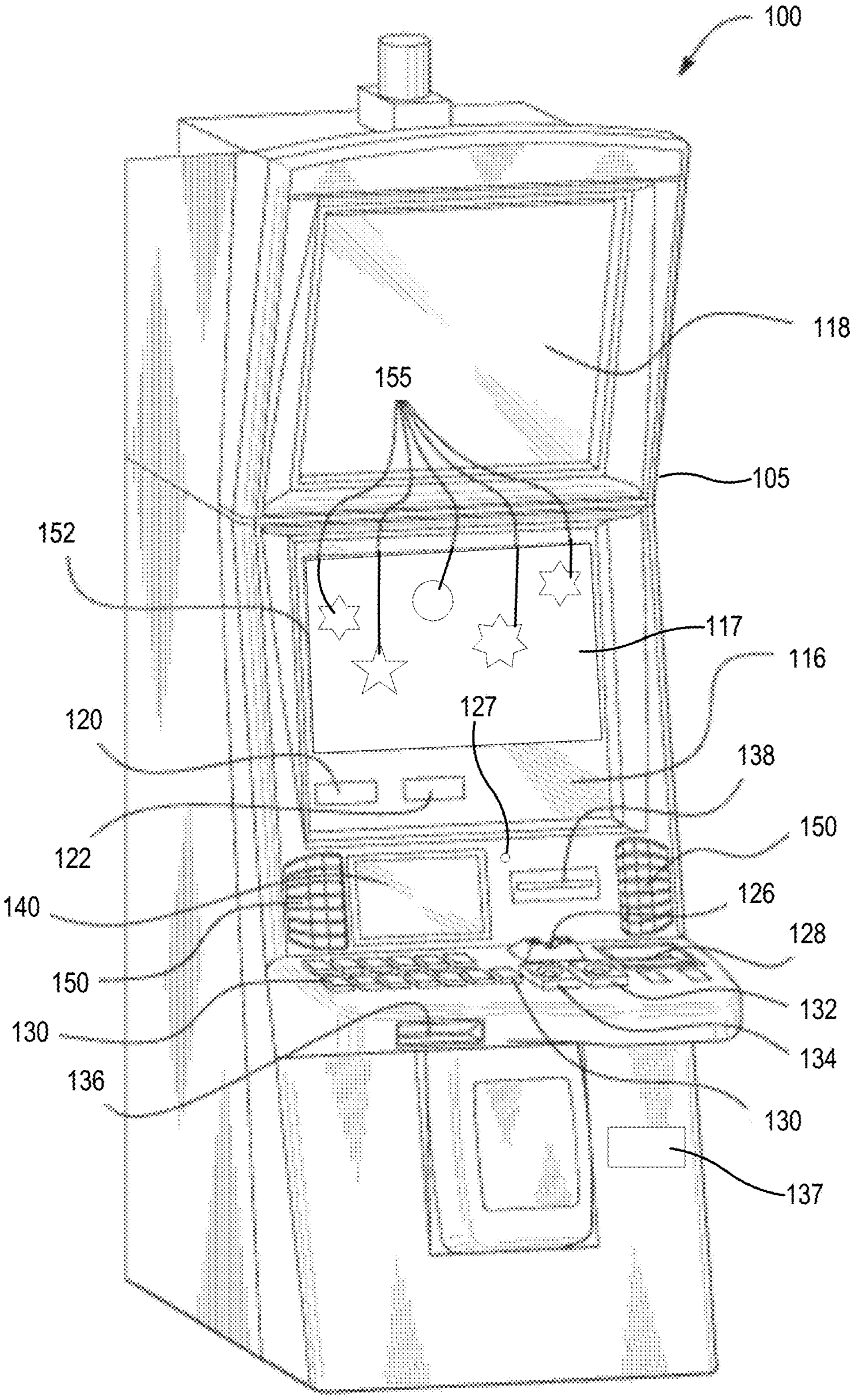
FIG. 2A is a perspective view of a gaming device that can be configured according to some embodiments.
Figure 2B:
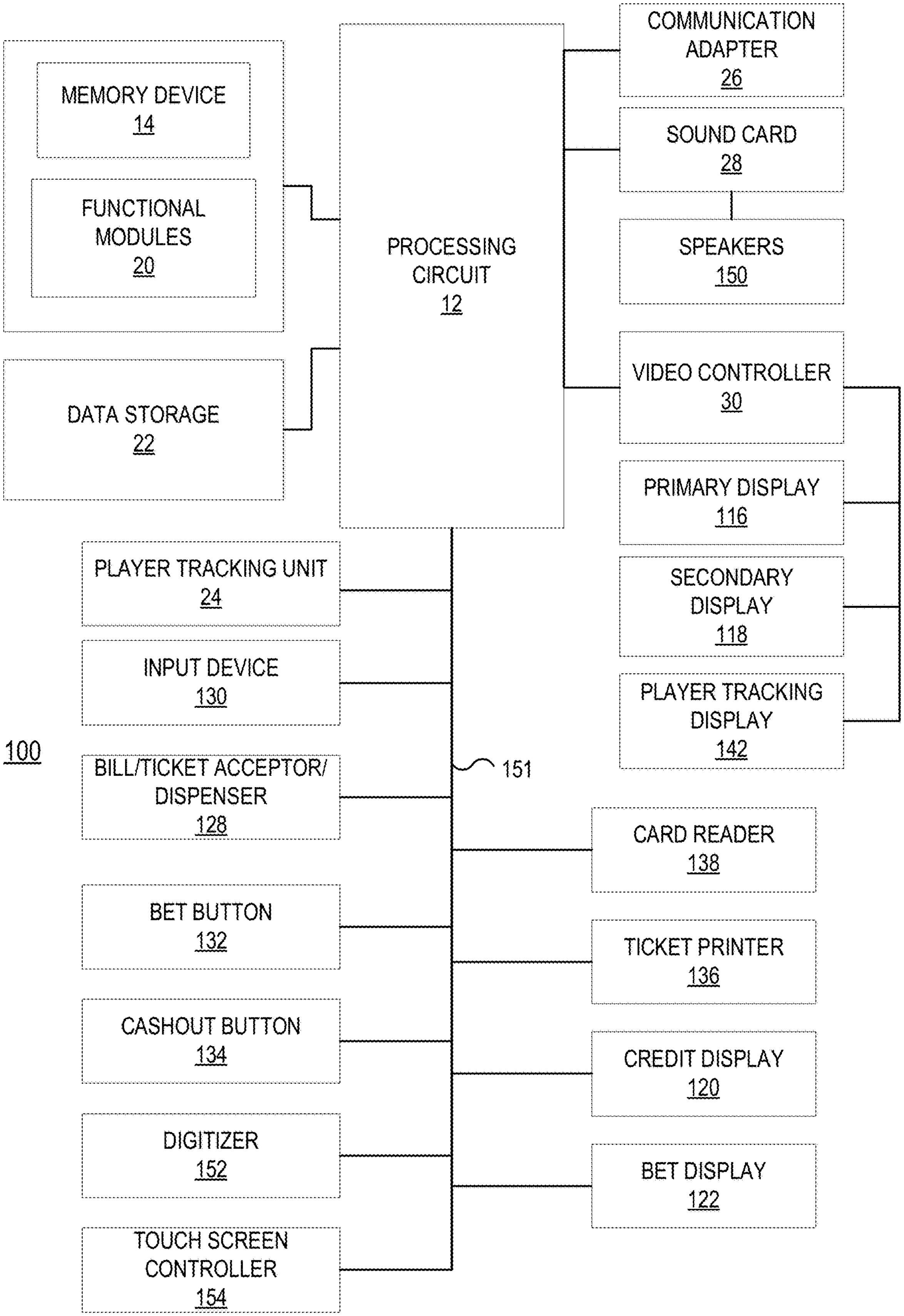
FIG. 2B is a schematic block diagram illustrating an electronic configuration for a gaming device according to some embodiments.
Figure 2C:
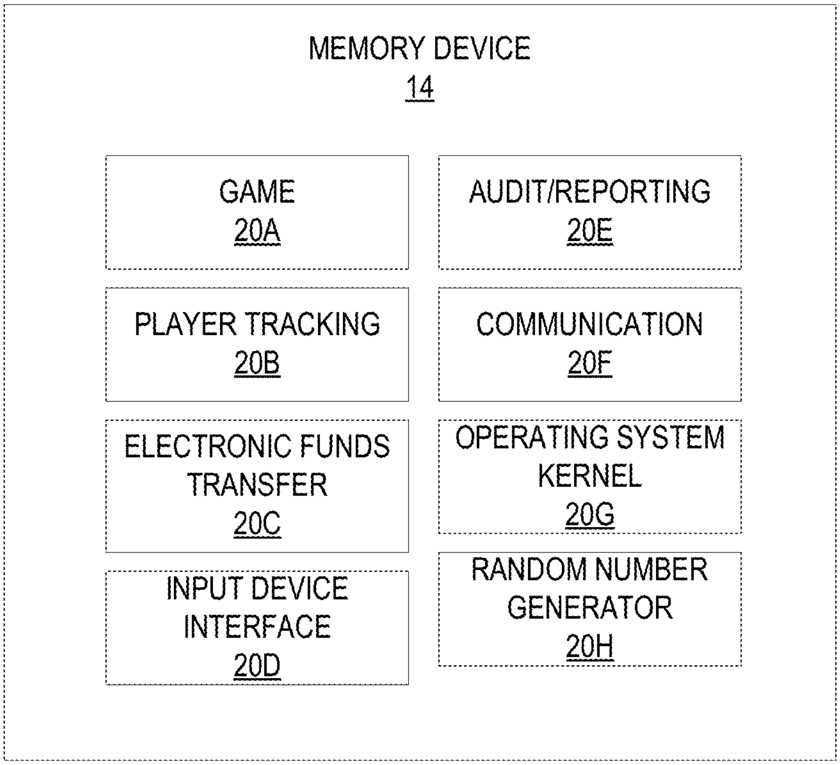
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc (DVD) or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface (SCSI) ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
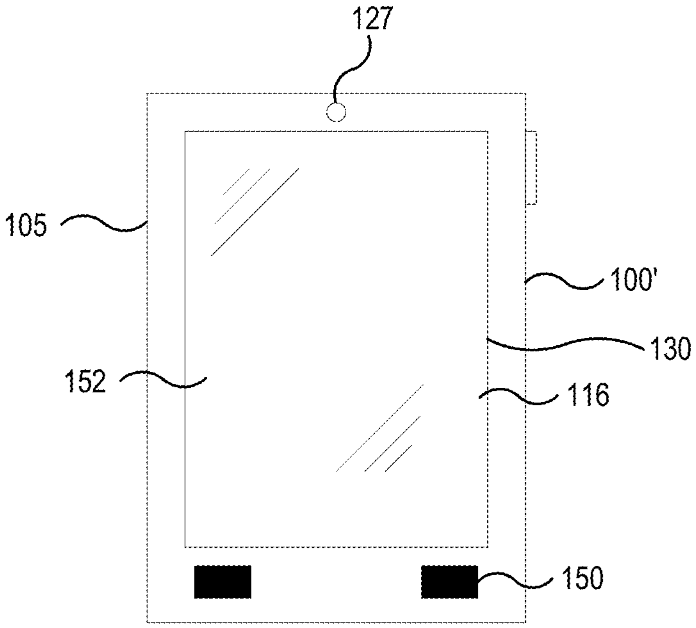
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
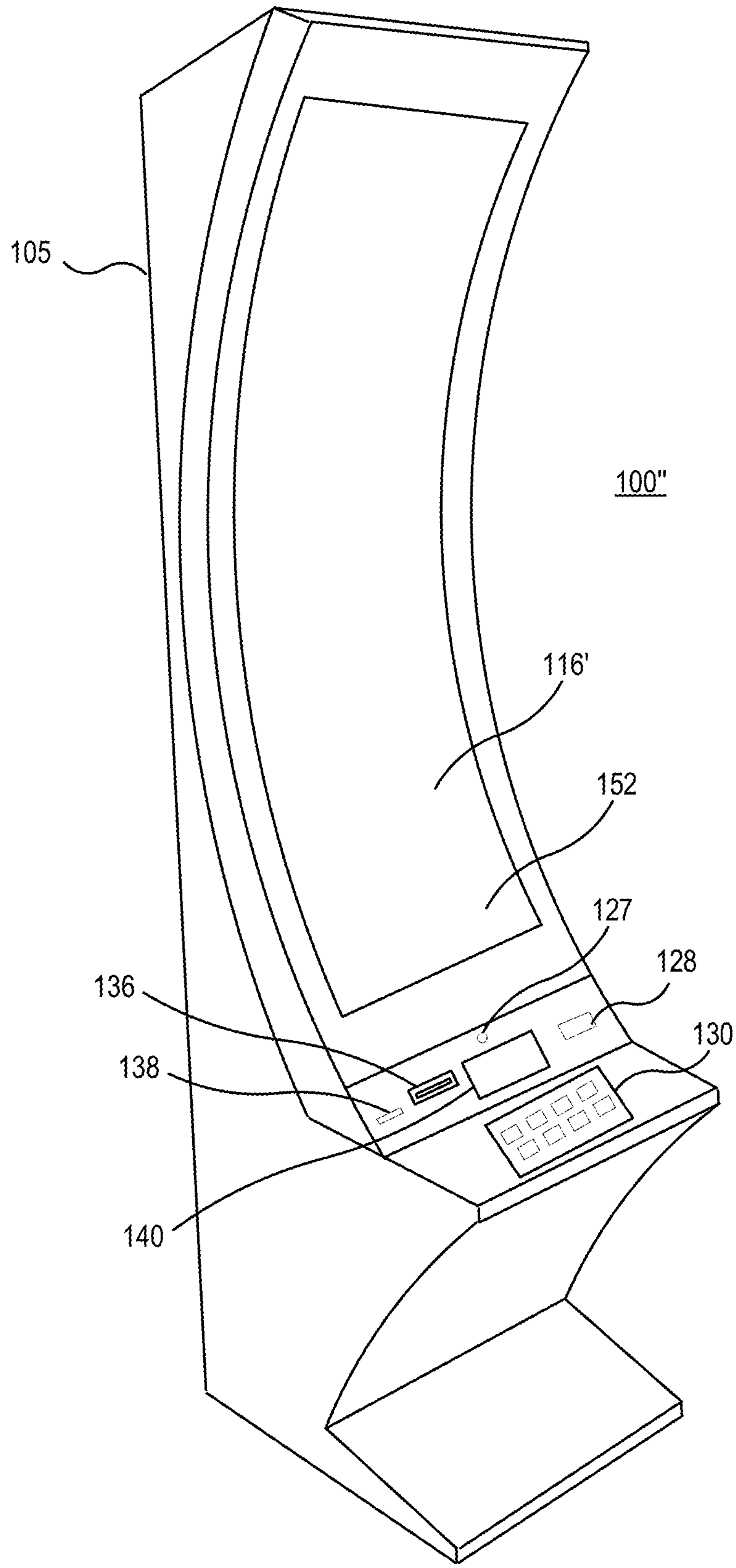
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3:
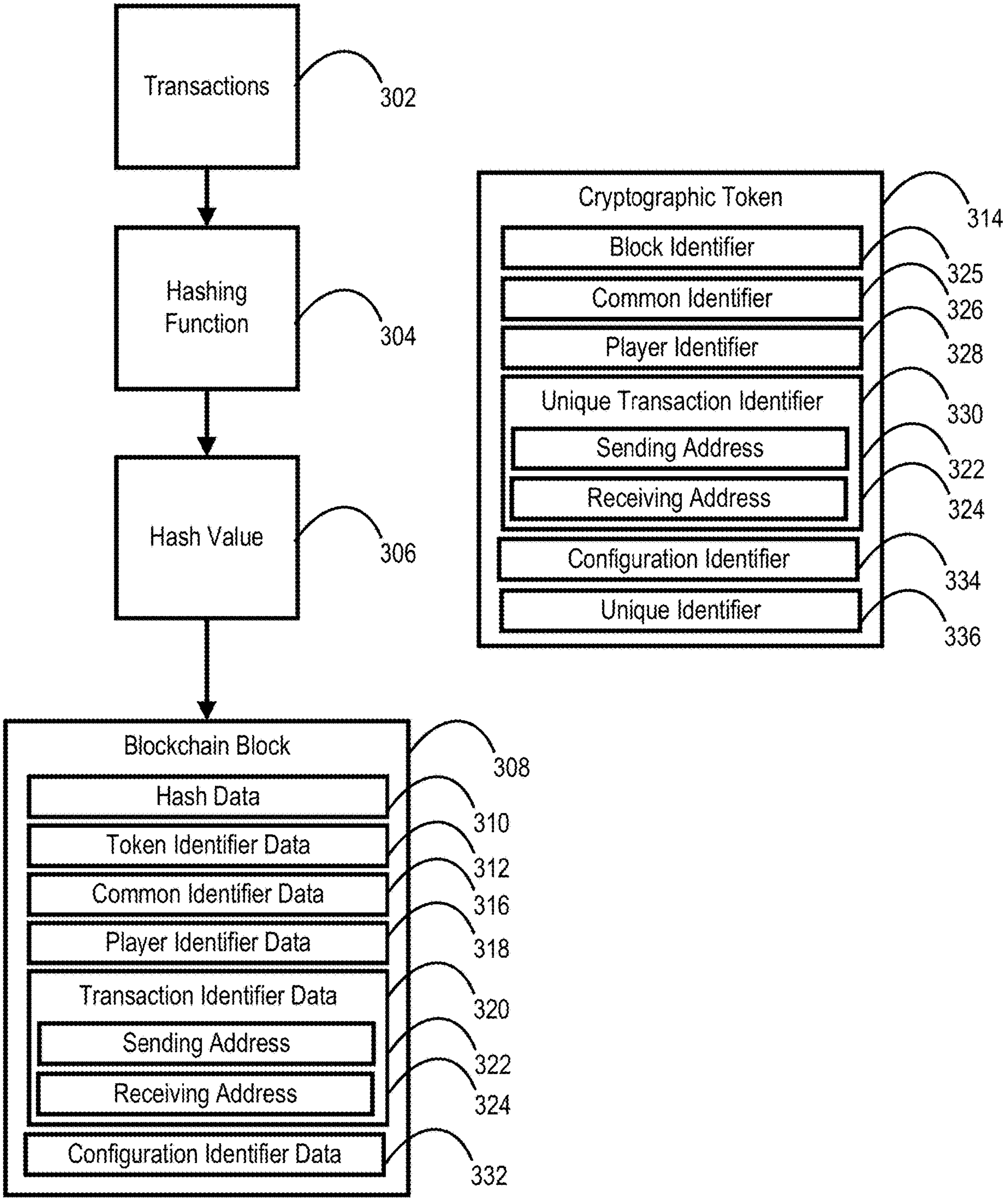
FIG. 3 a schematic block diagram illustrates various operations for a blockchain transaction recordation according to some embodiments.

Referring now to FIG. 3, a schematic block diagram illustrates various operations for a blockchain transaction recordation according to some embodiments. As illustrated in FIG. 3, transactions 302 may occur at various blockchain nodes. In accordance with various embodiments, a hash may be created for each entry. For example, a cryptographic hash function may create a one-way, (essentially) collision free signature of the entry. The hash algorithm generates a hash. Using hashing function 304, hash values 306 of these transactions are created and added to blockchain blocks 308 that are in the blockchain data structure.

In this example, each blockchain block 308 may include one or more different types of data. For example, each blockchain block 308 may include cryptographic hash data 310 indicative of a result of the hashing function 304 associated with a common blockchain, token identifier data 312 indicative of an identity of a cryptographic token 314 associated with the block 308, common identifier data 316 indicative of the cryptographic token 314 being part of a plurality of cryptographic tokens, e.g., a defined subset of tokens based on different criteria, associated with the common blockchain, player identifier data 318 indicative of an identity of a player associated with the cryptographic token 314, transaction identifier data 320 associated with the unique transaction on the blockchain, which may include a sending address 322 associated with a provider of the cryptographic token 314 and a receiving address 324 associated with the player identifier data 318.

In some examples, each block 308 may further include configuration identifier data 332 associated with a configuration set (e.g., a visual, audio, or haptic configuration associated with operation of an EGM or a game provided by an EGM) associated with the cryptographic token 314. Alternatively or in addition, the cryptographic token 314 may include a configuration set identifier 334 corresponding to the configuration set and/or configuration identifier data 332. Each cryptographic token 314 may be a fungible token that is fungible with other cryptographic tokens, and/or may further include a unique identifier 336, which may correspond to the token identifier data 312 of the block 308, such that the cryptographic token 314 is a non-fungible token that is not fungible with other cryptographic tokens.

The cryptographic token 314 may include some or all of the data structure of the respective associated block 308 and/or may contain a block identifier 325 referring to the associated block 308, which allows the cryptographic token 314 to be securely and transparently authenticated against the blockchain. In some examples, the cryptographic token 314 may include a common identifier 326 corresponding to the common identifier data 316 and indicative of the cryptographic token 314 being part of the plurality of cryptographic tokens, and a player identifier 328 corresponding to the player identifier data 318 and indicative of a player associated with the cryptographic token 314. The cryptographic token 314 may include a unique transaction identifier 330 associated with a unique transaction on the blockchain, i.e., a unique block 308, and may include the sending address 322 and/or the receiving address 324.

For example, a new transaction for the cryptographic token may include transmitting a transaction indication of the new transaction including a sending address 322 and receiving address 324, and, based on the transaction indication, modifying the player identifier data 318 in a new block 308 and/or the player identifier 328 of the cryptographic token 314 to be indicative of a different player.

In some examples, each block 308 may further include configuration identifier data 332 associated with an EGM configuration with the cryptographic token 314. Alternatively or in addition, the cryptographic token 314 may include a configuration identifier 334 corresponding to the configuration set and/or configuration identifier data 332. Each cryptographic token 314 may be a fungible token that is fungible with other cryptographic tokens, and/or may further include a unique identifier 336, which may correspond to the token identifier data 312 of the block 308, such that the cryptographic token 314 is a non-fungible token that is not fungible with other cryptographic tokens.

As a general principle, a validation process may be performed to ensure that each new blockchain block 308 meets the criteria for inclusion into the blockchain data structure. In a blockchain configuration, there are varying consensus algorithms that can be used. For example, a private blockchain may choose an algorithm such as Practical Byzantine Fault Tolerance (PBFT). The PBFT mechanism may be useful for small networks, such as networks having fewer than about 100 nodes. Other examples include a Proof of Work (PoW) consensus algorithm and/or a Proof of Stake (POS) consensus algorithm, which may be used as the value of an underlying data block and/or value changes.

Various embodiments herein describe generating a digital asset (e.g., a NFT) indicating a configuration set (e.g., a theme). A player can own the digital assets and subsequently use the NFT to cause an EGM to use the configuration set.

In some embodiments, player data may be received from a casino or other entity to determine which players would earn which tokens to be added to a player's account or card. Some embodiments provide that that the token may be a physical token first, such as a voucher card.

In some embodiments, the voucher card may be themed with a theme corresponding to a configuration set (e.g., a game theme). The voucher card may show its FT value and/or its NFT asset and may include the terms and conditions about where and when the voucher card may be redeemed. Some embodiments provide that, once activated, the respective configuration set in the venue turns into a digital token.

In some embodiments, the token may be a digital token without a corresponding physical token and may be stored in a player's crypto wallet. Some embodiments provide that the token may be redeemed and/or traded directly from there, once available.

Figure 4:
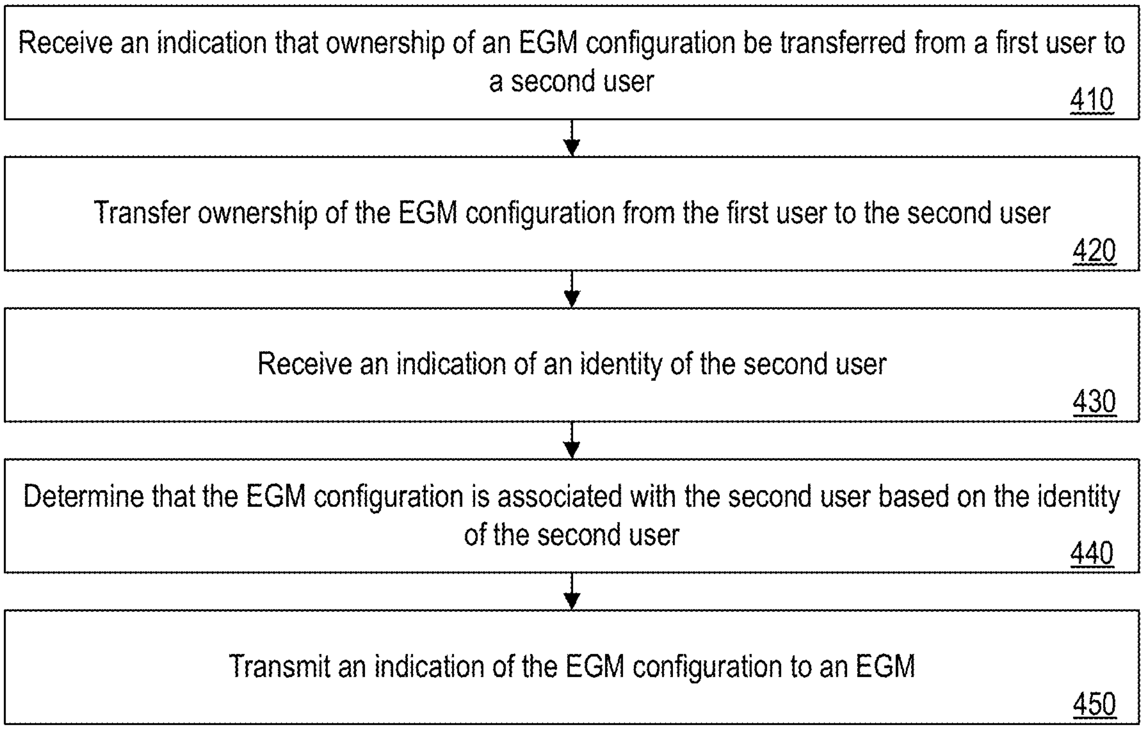
FIG. 4 is a flow chart illustrating an example of operations performed by an EGM configuration system according to some embodiments.

FIG. 4 is a flow chart illustrating an example of operations performed by an EGM configuration system according to some embodiments. Although the operations in FIG. 4 will be described in regards to central controller 40 of FIG. 1, the operations can be performed by other suitable entity (e.g., an EGM or a remote server).

At block 410, processing circuit 42 receives, via a network interface 46, an indication that ownership of an EGM configuration be transferred from a first user to a second user. In some embodiments, an EGM configuration includes any alteration to operation of an EGM. In some examples, the EGM configuration includes changes to graphical configurations (e.g., adjustments to screen brightness, font size, colorblindness settings, user interface format, or menu style). In additional or alternative examples, the EGM configuration includes changes to audio configurations (e.g., adjustments to sound volume, sound output source, or a language filter). In additional or alternative examples, the EGM configuration includes changes to the games that are made available to the user.

In additional or alternative embodiments, the EGM configuration includes user preferences associated with the user, the user preferences include at least one of: a graphics configuration that affects graphics displayed during operation of the EGM; an audio configuration that affects sound output during operation of the EGM; and a gambling configuration that affects default gambling settings during operation of the EGM.

In some examples, the EGM configuration includes the wager configuration and the wager configuration includes an indication that the EGM provide the game using the game skin as a wager by the user.

In additional or alternative examples, the EGM configuration includes the prize configuration and the prize configuration includes an indication that the EGM adjust the game skin based on an outcome of the game.

In some embodiments, the EGM configuration includes a game skin owned by the user. In some examples, configurations associated with the game skin include an indication of at least one of: a graphics configuration that affects graphics displayed during operation of a game on the EGM; an audio configuration that affects sound output during operation of the game on the EGM; a wager configuration that affects a wager made by the user in association with operation of the EGM; and a prize configuration that affects prizes available during operation of the game on the EGM. Herein the terms game skin and game theme are used interchangeably to refer to configurations associated with operation of a game.

In some examples, a game skin can include any piece of graphic associated with operation of a game (e.g., a game-symbol, font character, background picture, or animation), any piece of audio associated with operation of the game (e.g., background music or sound effects), and any piece of haptic feedback associated with operation of the game (e.g., vibrations associated with game elements). In additional or alternative examples, a game skin can include changes to the underlying game including modified bonus games, modified wager amounts, modified paylines, and/or modified pay tables.

In additional or alternative examples, a game skin can include personalized content. The personalized content may be uploaded and/or edited by a user. For example, a user may obtain an image and generate and/or modify a game-skin to include the image as a symbol in a game. The image may be selected by the user from a set of images or may be designed/uploaded by the user. In some examples, an EGM may provide a procedure for a user to modify any configuration (e.g., a game skin) and save the configuration (or an indication of the configuration) as associated with a token owned by the user. In additional or alternative examples, a server separate from the EGM or a personal computer may be used by the user to modify the configuration associated with a token.

Specific examples of game skins may include an Egyptian Theme and a Jungle Theme for a slot game. When the slot game is played with the Egyptian Theme: the symbols may include Egyptian gods and hieroglyphics, the music may have an Egyptian feel, and a bonus game may be unlocked that involves escaping a pit of asps. When the slot game is played with the Jungle Theme: the symbols may include jungle animals and lost artifacts, the music may have a jungle feel, and a bonus game may include escaping a rolling boulder.

At block 420, processing circuit 42 transfers ownership of the EGM configuration from the first user to the second user. In some embodiments, the EGM configuration is included in a non-fungible token (NFT) that includes a cryptographic asset including a unique identification code. Receiving the indication of the identity of the user includes receiving an indication of the NFT. Transferring ownership of the EGM configuration can include recording transfer of the NFT to the first user on a NFT ledger.

At block 430, processing circuit 42 receives, via a network interface 46, an indication of an identity of the second user.

At block 440, processing circuit 42 determines that the EGM configuration is associated with the second user based on the identity of the second user. In some embodiments, determining the EGM configuration associated with the first user includes comparing the identity of the user with a NFT ledger.

At block 450, processing circuit 42 transmits, via a network interface 46, an indication of the EGM configuration of an EGM. In some embodiments, the EGM configuration includes a game skin owned by the user. Transmitting the indication of the EGM configuration to the EGM includes transmitting an indication of configurations associated with the game skin. In some examples, transmitting the indication of configurations associated with the game skin includes transmitting an indication of at least one of: a graphics configuration that affects graphics displayed during operation of a game on the EGM; an audio configuration that affects sound output during operation of the game on the EGM; a wager configuration that affects a wager made by the user in association with operation of the EGM; and a prize configuration that affects prizes available during operation of the game on the EGM.

In additional or alternative determining the EGM configuration includes determining a plurality of EGM configurations associated with the user of the EGM based on the identity of the user. Transmitting the indication of the EGM configuration includes transmitting an indication of a plurality of EGM configurations that are each associated with the user.

Figure 5:
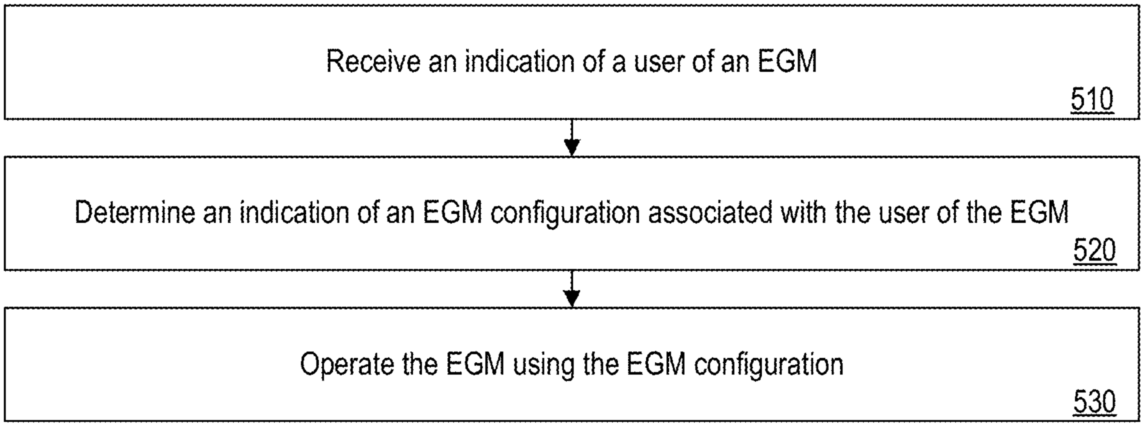
FIG. 5 is a flow chart illustrating an example of operations performed by an EGM according to some embodiments.

FIG. 5 is a flow chart illustrating an example of operations performed by an EGM according to some embodiments. Although the operations in FIG. 5 will be described in regards to EGM 100 of FIGS. 1 and 2A-B, the operations can be performed by any suitable EGM (e.g., EGM 100' of FIG. 2D or 100" of FIG. 2E).

At block 510, processing circuit 12 receives, via communication adapter 26, an indication of a user of an EGM.

At block 520, processing circuit 12 determines an indication of an EGM configuration associated with the user of the EGM. In some embodiments, the EGM configuration includes user preferences associated with the user, the user preferences including at least one of: a graphics configuration that affects graphics displayed during operation of the EGM; an audio configuration that affects sound output during operation of the EGM; and a gambling configuration that affects default gambling settings during operation of the EGM.

In additional or alternative embodiments, determining the indication of the EGM configuration includes determining the indication of the EGM configuration based on the identification of the user of the EGM. In some examples, determining the indication of the EGM configuration based on the identification of the user of the EGM includes: transmitting an indication of the identification of the user of the EGM to a configuration system; and receiving the indication of the EGM configuration from the configuration system. In additional or alternative examples, receiving the indication of the EGM configuration further includes: receiving an indication of a plurality of EGM configurations associated with the user from the configuration system; displaying the indication of the plurality of EGM configurations associated with the user; and receiving a selection of the EGM configuration from the plurality of EGM configurations by the user.

In additional or alternative embodiments, determining the indication of the EGM configuration includes receiving an indication of the EGM configuration from a device associated with the user. In some examples, receiving the indication of the EGM configuration from the device associated with the user includes receiving a non-fungible token (NFT) indicating the EGM configuration from the device associated with the user, the NFT comprising a cryptographic asset comprising a unique identification code At block 530, processing circuit 12 operates the EGM using the EGM configuration. In some embodiments, the EGM configuration includes a game skin owned by the user. In additional or alternative embodiments, operating the EGM using the EGM configuration includes providing a game using the game skin. In some examples, the game skin includes at least one of: a graphics configuration that affects graphics displayed during operation of a game on the EGM; an audio configuration that affects sound output during operation of the game on the EGM; a wager configuration that affects a wager made by the user in association with operation of the EGM; and a prize configuration that affects prizes available during operation of the game on the EGM.

In additional or alternative embodiments, the EGM configuration includes the wager configuration. In some examples, operating the EGM using the wager configuration includes providing the game using the game skin as a wager by the user.

In additional or alternative embodiments, the EGM configuration includes the prize configuration. In some examples, operating the EGM using the prize configuration includes adjusting the game skin based on an outcome of the game.

Figure 6:
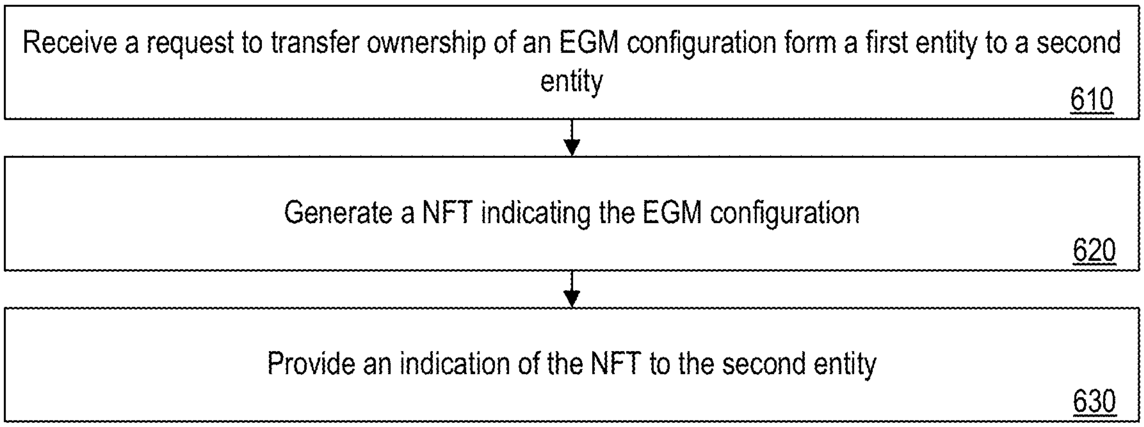
FIG. 6 is a flow chart illustrating an example of operations performed by a system configured to provide a marketplace for EGM configurations according to some embodiments.

FIG. 6 is a flow chart illustrating an example of operations performed by a system configured to provide a marketplace for EGM configurations according to some embodiments. Although the operations in FIG. 6 will be described in regards to central controller 40 of FIG. 1, the operations can be performed by other suitable entity (e.g., an EGM or a remote server).

At block 610, processing circuit 42 receives, via a network interface 46, a request to transfer ownership of an EGM configuration from a first entity to a second entity. At block 620, processing circuit 42 generates a NFT indicating the EGM configuration. At block 630, processing circuit 42 provides an indication of the NFT to the second entity.

Embodiments described herein may be implemented in various configurations for EGMs 100*s*, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device. For example, a mobile device may be communicatively coupled to an EGM and may include a user interface that receives user inputs that are received to control the EGM. The user inputs may be received by the EGM via the mobile device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Embodiments provided herein may provide improved accessibility to wagering stations by including additional user interface technologies, such as virtual and/or augmented reality. Such embodiments may improve technological efficiency by coordinating the augmented reality with examples of different types of wagering stations.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A method of operating an electronic gaming machine (EGM) configuration system, the method comprising:

processing, by a processing circuit, output of a magnetic or electromagnetic reader of an EGM to determine an identity of a user of the EGM;

determining, by the processing circuit, an EGM configuration associated with the user based on the identity of the user, wherein determining the EGM configuration comprises determining a plurality of EGM configurations associated with the user of the EGM based on the identity of the user; and transmitting, by the processing circuit over a remote link of a data communication network, an indication of the EGM configuration to the EGM, wherein transmitting the indication of the EGM configuration comprises transmitting an indication of the plurality of EGM configurations that are each associated with the user.

2. The method of claim 1, wherein the EGM configuration comprises a game skin owned by the user, and wherein transmitting the indication of the EGM configuration to the EGM comprises transmitting an indication of configurations associated with the game skin.

3. The method of claim 2, wherein transmitting the indication of configurations associated with the game skin comprises transmitting an indication of:

a graphics configuration that affects graphics displayed during operation of a game on the EGM;

an audio configuration that affects sound output during operation of the game on the EGM;

a wager configuration that affects a wager made by the user in association with operation of the EGM; and a prize configuration that affects prizes available during operation of the game on the EGM.

4. The method of claim 3, wherein the EGM configuration comprises the wager configuration, and wherein the wager configuration comprises an indication that the EGM provide the game using the game skin as a wager by the user.

5. The method of claim 3, wherein the EGM configuration comprises the prize configuration, and wherein the prize configuration comprises an indication that the EGM adjust the game skin based on an outcome of the game.

6. The method of claim 1, wherein the EGM configuration comprises user preferences associated with the user, the user preferences comprising:

a graphics configuration that affects graphics displayed during operation of the EGM;

an audio configuration that affects sound output during operation of the EGM; and a gambling configuration that affects default gambling settings during operation of the EGM.

7. The method of claim 1, wherein processing the output of the magnetic or electromagnetic reader comprises receiving an indication of a non-fungible token (NFT).

8. The method of claim 1, wherein the EGM configuration is comprised in a non-fungible token (NFT) that comprises a cryptographic asset comprising a unique identification code, wherein receiving the indication of the identity of the user comprises receiving an indication of the NFT, and wherein the user is a first user, the method further comprising:

prior to determining the EGM configuration associated with the first user, receiving an indication that the NFT be transferred from a second user to the first user; and recording transfer of the NFT to the first user on a NFT ledger, wherein determining the EGM configuration associated with the first user comprises comparing the identity of the user with the NFT ledger.

9. A method of operating an electronic gaming machine (EGM), the method comprising:

determining, by a processing circuit, an indication of an EGM configuration associated with an identity of a user of the EGM, wherein the EGM configuration comprises user preferences associated with the user, the user preferences comprising:

a graphics configuration that affects graphics displayed during operation of the EGM;

an audio configuration that affects sound output during operation of the EGM; and a gambling configuration that affects default gambling settings during operation of the EGM; and operating, by the processing circuit, a display and one or more speakers of the EGM to implement the EGM configuration.

10. The method of claim 9, wherein the EGM configuration comprises a game skin owned by the user, and wherein operating the EGM using the EGM configuration comprises providing a game using the game skin.

11. The method of claim 10, wherein the game skin comprises:

a game graphics configuration that affects graphics displayed during operation of a game on the EGM;

a game audio configuration that affects sound output during operation of the game on the EGM;

a wager configuration that affects a wager made by the user in association with operation of the EGM; and a prize configuration that affects prizes available during operation of the game on the EGM.

12. The method of claim 11, wherein the EGM configuration comprises the wager configuration, and wherein operating the EGM using the wager configuration comprises providing the game using the game skin as a wager by the user.

13. The method of claim 11, wherein the EGM configuration comprises the prize configuration, and wherein operating the EGM using the prize configuration comprises adjusting the game skin based on an outcome of the game.

14. The method of claim 9, further comprising:

processing, by the processing circuit, output of a magnetic or electromagnetic reader of the EGM to determine the identity of the user.

15. The method of claim 9, further comprising:

receiving an indication of the identity of the user of the EGM, wherein determining the indication of the EGM configuration comprises determining the indication of the EGM configuration based on the identity of the user of the EGM, and wherein determining the indication of the EGM configuration based on the identity of the user of the EGM comprises:

transmitting an indication of the identity of the user of the EGM to a configuration system; and receiving the indication of the EGM configuration from the configuration system.

16. The method of claim 15, wherein receiving the indication of the EGM configuration further comprises:

receiving an indication of a plurality of EGM configurations associated with the user from the configuration system;

displaying the indication of the plurality of EGM configurations associated with the user; and receiving a selection of the EGM configuration from the plurality of EGM configurations by the user.

17. The method of claim 9, wherein determining the indication of the EGM configuration comprises:

receiving an indication of the EGM configuration from a device associated with the user.

18. The method of claim 17, wherein receiving the indication of the EGM configuration from the device associated with the user comprises receiving a non-fungible token (NFT) indicating the EGM configuration from the device associated with the user, the NFT comprising a cryptographic asset comprising a unique identification code.

19. A method of operating a system configured to provide a marketplace for electronic gaming machine (EGM) configurations, the method comprising:

receiving, by a processing circuit, a request to transfer ownership of an EGM configuration from a first entity to a second entity, the EGM configuration comprising a graphics configuration that affects graphics displayed during operation of an EGM;

generating, by the processing circuit, a non-fungible token (NFT) that comprises a cryptographic asset comprising a unique identification code indicating the EGM configuration;

providing, by the processing circuit, an indication that ownership of the NFT has been transferred from the first entity to the second entity; and recording, by the processing circuit, the transfer of ownership of the NFT from the first entity to the second entity in a blockchain ledger.

20. The method of claim 19, wherein the EGM configuration comprises:

an audio configuration that affects sound output during operation of the EGM; and a gambling configuration that affects default gambling settings during operation of the EGM.

* * * * *